United States Patent
Huang et al.

(10) Patent No.: US 8,300,319 B2
(45) Date of Patent: Oct. 30, 2012

(54) ZOOM LENS SYSTEM

(75) Inventors: Hai-Jo Huang, Taipei Hsien (TW);
Fang-Ying Peng, Taipei Hsien (TW);
Sheng-An Wang, Taipei Hsien (TW);
Xiao-Na Liu, Guangdong (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 151 days.

(21) Appl. No.: 12/977,090

(22) Filed: Dec. 23, 2010

(65) Prior Publication Data
US 2012/0099209 A1    Apr. 26, 2012

(30) Foreign Application Priority Data
Oct. 21, 2010  (CN) .......................... 2010 1 0514760

(51) Int. Cl.
*G02B 15/14* (2006.01)

(52) U.S. Cl. ........................................ 359/687; 359/686
(58) Field of Classification Search .................. 359/684, 359/686, 687
See application file for complete search history.

(56) References Cited

FOREIGN PATENT DOCUMENTS
CN            101206304 B       6/2010

*Primary Examiner* — David N Spector
(74) *Attorney, Agent, or Firm* — Altis Law Group, Inc.

(57) ABSTRACT

A zoom lens system includes, in the order from the object side to the image side thereof, a first lens group of positive refraction power, a second lens group of negative refraction power, a third lens group of positive refraction power, a fourth lens of positive refraction power, and an imaging plane. The first lens group and the third lens group are immovably mounted. The second lens group and the fourth lens group are movably mounted. The zoom lens system satisfies the formulae: $5<f3/f4<8.2$; and $2.1<|f2/fw|<3.2$, wherein f2-f4 respectively represent the effective focal lengths of the second, third and fourth lens groups, fw represents the shortest effective focal length of the zoom lens system.

18 Claims, 10 Drawing Sheets

ZOOM LENS SYSTEM

BACKGROUND

1. Technical Field

The present disclosure relates to lens systems and, more particularly, to a zoom lens system.

2. Description of Related Art

In recent years, image sensor chips, such as CCD (Charge Coupled Device) and CMOS (Complementary Metal Oxide Semiconductor), have become smaller in size. Therefore, there is a need for miniaturizing a zoom lens to match the image sensor chips, while maintaining an optical performance of the zoom lens at the same time.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments.

DETAILED DESCRIPTION

Embodiments of the present disclosure will now be described in detail below, with reference to the accompanying drawings.

Figure 1:
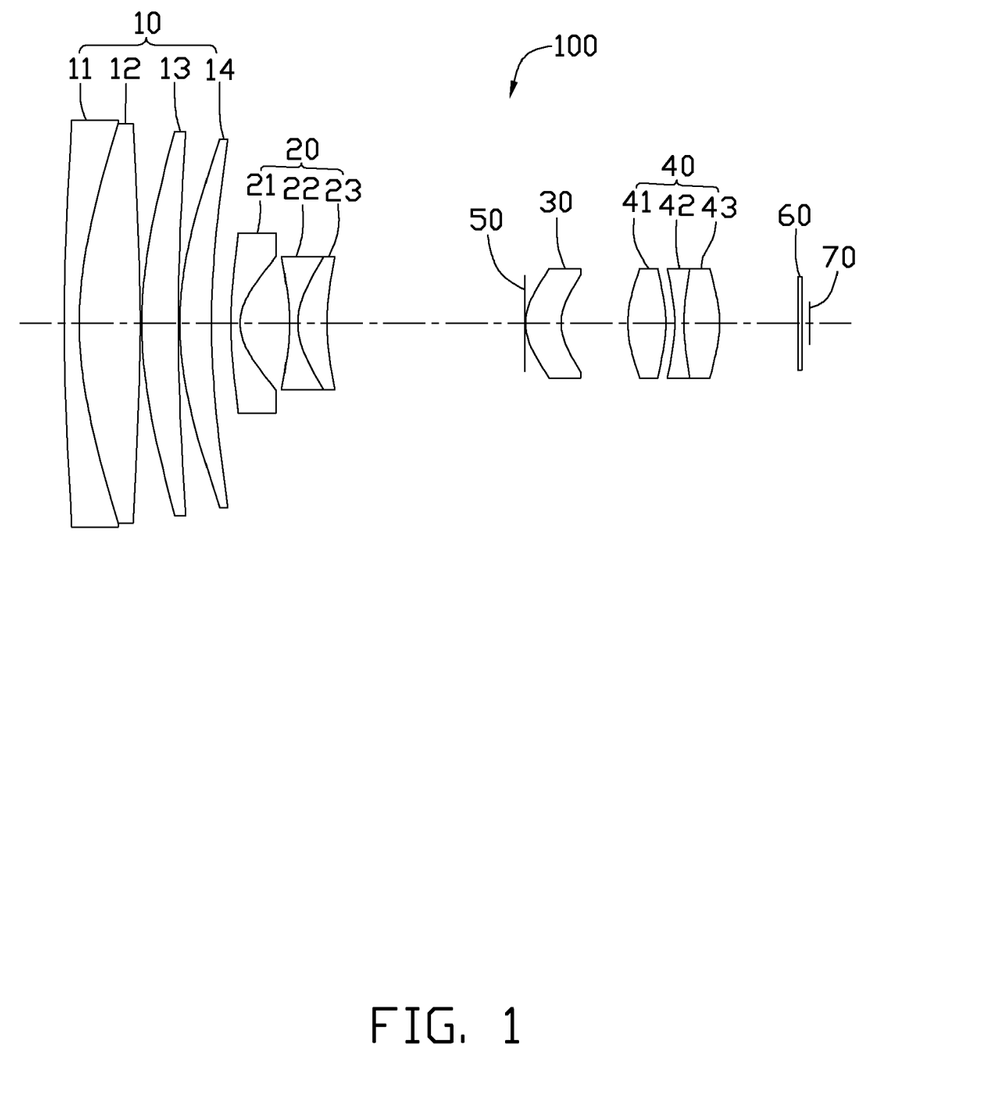
FIG. 1 is a schematic view of a zoom lens system according to an exemplary embodiment.

Referring to FIG. 1, a zoom lens system 100 according to an exemplary embodiment is shown. The zoom lens system 100 includes, in order from an object side to an image side thereof, a first lens group 10 with positive refraction power, a second lens group 20 with negative refraction power, an aperture stop 50, a third lens group 30 with positive refraction power, a fourth lens group 40 with positive refraction power, and a filter 60. An imaging plane 70 is positioned front of the filter 60 at the image side of the zoom lens system 100. When capturing an image, incident light enters the zoom lens system 100, transmitting through the first lens group 10, the second lens group 20, the aperture stop 50, the third lens group 30, the fourth lens group 40, and the filter 60, and finally is focused onto the imaging plane 70 where an image sensor (not shown) such as a charge-coupled device (CCD) or a complementary metal oxide semiconductor (CMOS) is located.

The first lens group 10 and the third lens group 30 are immovably mounted. The second lens group 20 and the fourth lens group 40 are movably mounted. Thereby, the effective focal length of the zoom lens system 100 can be adjusted by moving the second lens group 20 and the fourth lens group 40 along the optical axis thereof. In particular, the distance between the first lens group 10 and the second lens group 20 along the optical axis of the zoom lens system 100 increases when the zoom lens system 100 is set to switch from a wide angle state to a telephoto state.

In this embodiment, the first lens group 10 includes, in the order from the object side to the image side of the zoom lens system 100, a first lens 11, a second lens 12, a third lens 13 and a fourth lens 14. The first lens 11 is concave, crescent-shaped, and convex to the object side. The second lens 12 is a convex lens, convex to the object side. The first lens 11 and the second lenses 12 are unified as a compound lens using adhesive. The third lens 13 is convex crescent-shaped, convex to the object side. The fourth lens 14 is a spherical lens made of glass and is convex, crescent-shaped, and convex to the object side. The fourth lens 14 can reduce the spherical aberration of the first lens group 10 when the zoom lens system 100 is in a middle state or in the telephoto state, thus enhancing the resolution of the zoom lens system 100.

The second lens group 20 includes, in the order from the object side to the image side of the zoom lens system 100, a fifth lens 21, a sixth lens 22, and a seventh lens 23. The fifth lens 21 is concave, crescent-shaped, and convex to the object side. The sixth lens 22 has negative refraction power. The seventh lens 23 has positive refraction power. The sixth lens 22 and the seventh lenses 23 are unified as a compound lens using adhesive.

If the refraction power of the third lens group 30 is too short, it is hard to sufficiently reduce the spherical aberration. If the refraction power of the fourth lens group 40 is too short, the moving distance of the fourth lens group 40 along the optical axis of the zoom lens system 100 will be too long, that will lengthen the overall length of the zoom lens system 100, and shorten the back focus of the zoom lens system 100 in the telephoto state. In additional, if the refraction power of the second lens group 20 is too long, the assembly sensitivity of the zoom lens system 100 will increase, that will make the resolution of the zoom lens system 100 become unstable because of assembly error. If the refraction power of the second lens group 20 is too short, the moving distance of the second lens group 20 along the optical axis of the zoom lens system 100 will be too long, that will lengthen the overall length of the zoom lens system 100. Thus, in order to obtain a short overall length and low spherical aberration, the zoom lens system 100 is set to satisfy the following formulas:

$$5 < f3/f4 < 8.2; \qquad (1)$$

$$2.1 < |f2/fw| < 3.2; \qquad (2)$$

wherein, fw represents the shortest effective focal length of the zoom lens system 100, f2-f4 respectively represent the effective focal lengths of the second, third and fourth lens groups 20-40. The formulas (1) and (2) can favorably limit the relation between the focal length of the third lens group 30 and the focal length of the fourth lens group 40, and the relation between the focal length of the second lens group 20 and the shortest effective focal length of the zoom lens system 100, thus to increase resolution and reduce the overall length of the zoom lens system 100.

To correct chromatic aberration in the zoom lens system 100, the zoom lens system 100 further satisfies the formula:

$$70 < V2; \qquad (3)$$

wherein, V2 is the Abbe number of the second lens 12.

In this embodiment, the zoom lens system 100 further satisfies the following condition:

$$0.2 < M2/L < 0.4; \qquad (4)$$

wherein, M2 is the longest moving distance of the second lens group 20 from the wide angle state to the telephoto state. L is the overall length of the zoom lens system 100. The overall length is the distance between the surface of the first lens 11 facing the object side and the imaging plane 70. Formula (4) is for reducing the assembly sensitivity of the zoom lens system 100, shortening the length of the zoom lens system 100, and reducing the aberration of the field curvature and spherical aberration in the zoom process.

The third lens group 30 is served as the eighth lens. The third lens group 30 is convex crescent-shaped, convex to the object side. The third lens group 30 includes at least one aspherical surface. In the present embodiment, the third lens group 30 includes two aspherical surfaces to efficiently correct aberration. The third lens group 30 is made of plastic to reduce cost.

The fourth lens group 40 includes, in the order from the object side to the image side of the zoom lens system 100, a ninth lens 41, a tenth lens 42 and an eleventh lens 43. The ninth lens 41 has positive refraction power. The ninth lens 41 includes at least one aspherical surface. In the present embodiment, the ninth lens 41 includes two aspherical surfaces to efficiently correct aberration. The tenth lens 42 has negative refraction power. The eleventh lens 43 has positive refraction power. The tenth lens 42 and the eleventh lens 43 are unified as a compound lens using adhesive. The ninth lens 41 is separated from the compound lens of the tenth lens 42 and the eleventh lens 43 to reduce assembly risk in the adhere assembly.

To correct chromatic aberration in the zoom lens system 100, the zoom lens system 100 further satisfies the formula:

$$45 < (V6 - V7); \quad (5)$$

wherein, V6, V7 respectively represent the Abbe number of the sixth and seventh lenses 22, 23.

The aperture stop 50 is installed between the second lens group 20 and the third lens group 30. The aperture stop 50 is configured for adjusting light flux from the second lens group 20 to the third lens group 30, thus to facilitate uniform light transmission to correct coma aberrations of the zoom lens system 100. To minimize the manufacture cost and the overall length of the zoom lens system 100, the aperture stop 50 can be obtained by smearing an opaque material on an outer rim of the object side surface of the third lens group 30. The filter 60 is installed between the fourth lens group 40 and the imaging plane 70 for filtering infrared.

Example diagrams of the zoom lens system 100 will be described below with reference to FIGS. 2-10. It is to be understood that the disclosure is not limited to this example. In the present embodiment, both the second lens group 20 and the fourth lens group 40 of the zoom lens system 100 are made of glass. The object side surface and the image side surface of the third lens 13, the object side surface and the image side surface of the ninth lens 41 are all aspherical surfaces.

The above aspherical surfaces are shaped according to the formula:

$$x = \frac{ch^2}{1 + \sqrt{1 - (k+1)c^2h^2}} + \sum A_i h^i$$

wherein h is a height from the optical axis of the zoom lens system 100 to the aspherical surface, c is a vertex curvature, k is a conic constant, and Ai is i-th order correction coefficients of the aspheric surfaces.

The following are symbols used in the exemplary embodiment.

f: effective focal length of the zoom lens system 100;
D7: the distance between the first lens group 10 and the second lens group 20 along the optical axis of the zoom lens system 100 (the distance between the image side surface of the fourth lens 14 and the object side surface of the fifth lens 21 along the optical axis of the zoom lens system 100);
D12: the distance between the second lens group 20 and the third lens group 30 along the optical axis of the zoom lens system 100 (the distance between the image side surface of the seventh lens 23 and the object side surface of the third lens group 30 along the optical axis of the zoom lens system 100);
D15: the distance between the third lens group 30 and the fourth lens group 40 along the optical axis of the zoom lens system 100 (the distance between the image side surface of the third lens group 30 and the object side surface of the ninth lens 41 along the optical axis of the zoom lens system 100);
D20: the distance between the fourth lens group 40 and the filter 60 along the optical axis of the zoom lens system 100 (the distance between the image side surface of the eleventh lens 43 and the object side surface of the filter 60 along the optical axis of the zoom lens system 100);
$F_{No}$: F number;
$2\omega$: field angle;
R: radius of curvature.
D: distance between two adjacent lens surfaces along the optical axis of the zoom lens system 100.
Nd: refractive index of lens.
V: Abbe constant.

Tables 1-4 show the specifications of an embodiment of the zoom lens system 100.

TABLE 1

| The state of the zoom lens system 100 | F | D7 | D12 | D15 | D20 |
|---|---|---|---|---|---|
| The wide angle state of the zoom lens system 100 | 4.54 | 2.539 | 48.569 | 8.5 | 12.5485 |
| The middle state of the zoom lens system 100 | 34 | 38.024 | 13.084 | 5.7 | 15.347 |
| The telephoto state of the zoom lens system 100 | 167.75 | 49.054 | 2.052 | 19.3615 | 1.686 |

TABLE 2

| The state of the zoom lens system 100 | F | $F_{No}$ | $2\omega$ |
|---|---|---|---|
| The wide angle state of the zoom lens system 100 | 4.54 | 1.52 | 63 |
| The middle state of the zoom lens system 100 | 34 | 2.4 | 8.96 |
| The telephoto state of the zoom lens system 100 | 167.75 | 5.1 | 1.8 |

TABLE 3

| Surface | R (mm) | d (mm) | Nd | V |
|---|---|---|---|---|
| Object side surface of the first lens 11 | 349.73 | 1.92 | 1.85 | 23.8 |
| Image side surface of the first lens 11 (Object side surface of the second lens 12) | 67.41 | 7.8 | 1.5 | 81.6 |
| Image side surface of the second lens 12 | −373.6 | 0.2 | — | — |
| Object side surface of the third lens 13 | 72.85 | 4.7 | 1.8 | 46.5 |

TABLE 3-continued

| Surface | R (mm) | d (mm) | Nd | V |
|---|---|---|---|---|
| Image side surface of the third lens 13 | 300.57 | 0.2 | — | — |
| Object side surface of the fourth lens 14 | 56.74 | 4 | 1.8 | 46.5 |
| Image side surface of the fourth lens 14 | 129.31 | D7 | — | — |
| Object side surface of the fifth lens 15 | 69 | 1.15 | 1.83 | 37.3 |
| Image side surface of the fifth lens 15 | 10.07 | 6.37 | — | — |
| Object side surface of the sixth lens 22 | −37.35 | 1.02 | 1.5 | 81.6 |
| Image side surface of the sixth lens 22 (Object side surface of the seventh lens 23) | 12.39 | 3.8 | 1.85 | 23.8 |
| Image side surface of the seventh lens 23 | 36.65 | D12 | — | — |
| aperture stop 50 | infinity | 0.1 | — | — |
| Object side surface of the third lens group 30 | 9.16 | 4.56 | 1.53 | 56 |
| Image side surface of the third lens group 30 | 9.1 | D15 | — | — |
| Object side surface of the ninth lens 41 | 14.15 | 5 | 1.58 | 59.5 |
| Image side surface of the ninth lens 41 | −21.65 | 0.2 | — | — |
| Object side surface of the tenth lens 42 | −27 | 1.15 | 1.92 | 20.9 |
| Image side surface of the tenth lens 42 (Object side surface of the eleventh lens 43) | 32.85 | 4.55 | 1.84 | 43.1 |
| Image side surface of the eleventh lens 43 | −20.65 | D20 | — | — |
| Object side surface of the filter 60 | infinity | 0.5 | 1.52 | 64.2 |
| Image side surface of the filter 60 | infinity | 1 | — | — |
| Object side surface of the imaging plane 70 | infinity | — | — | — |

TABLE 4

| Surface | Aspherical coefficient |
|---|---|
| Object side surface of the third lens group 30 | k = 0;<br>A4 = −6.51314 × 10$^{-6}$; A6 = −9.02437 × 10$^{-7}$;<br>A8 = −6.11924 × 10$^{-9}$; A10 = 2.298787 × 10$^{-11}$ |
| Image side surface of the third lens group 30 | k = 0;<br>A4 = 8.492025 × 10$^{-5}$; A6 = 1.718978 × 10$^{-6}$;<br>A8 = −1.03274 × 10$^{-7}$; A10 = 1.931947 × 10$^{-9}$ |
| Object side surface of the ninth lens 41 | k = 0;<br>A4 = −6.27615 × 10$^{-5}$; A6 = 1.901262 × 10$^{-7}$;<br>A8 = −2.26512 × 10$^{-8}$; A10 = 1.937028 × 10$^{-10}$ |
| Image side surface of the ninth lens 41 | k = 0;<br>A4 = 6.268545 × 10$^{-5}$; A6 = 6.968704 × 10$^{-8}$;<br>A8 = −1.82837 × 10$^{-8}$; A10 = 1.69221 × 10$^{-10}$ |

Figure 2:
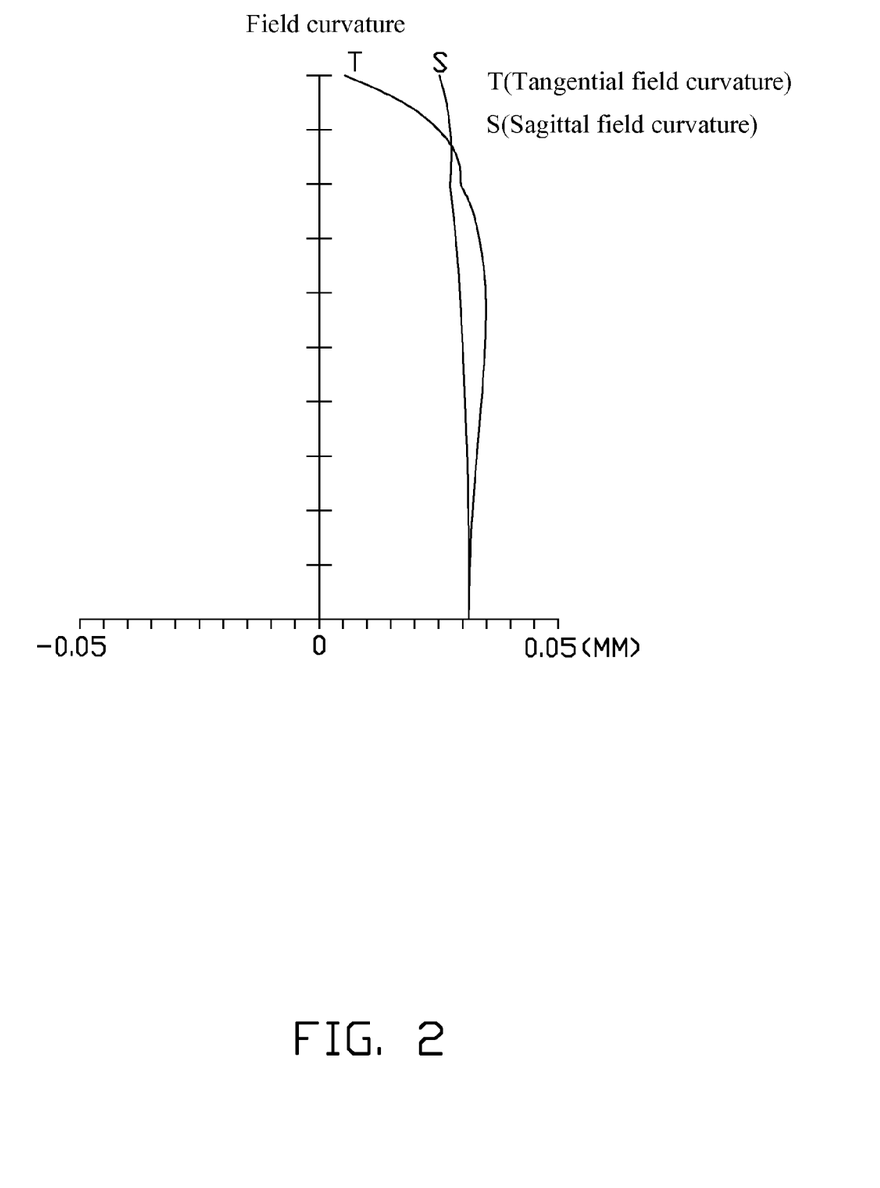
FIGS. 2~4 are graphs respectively showing field curvature, distortion and spherical aberration occurring in the zoom lens system, when the zoom lens system is in a wide angle state.
Figure 3:
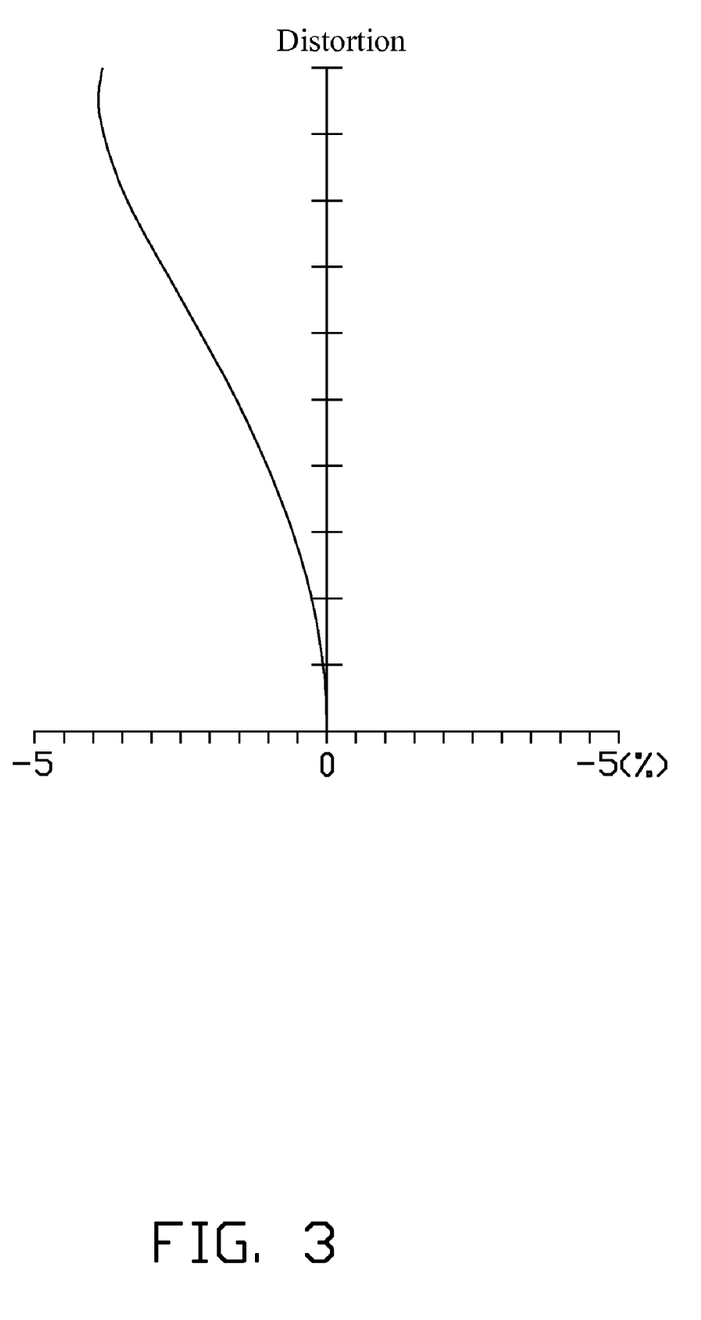
Figure 4:
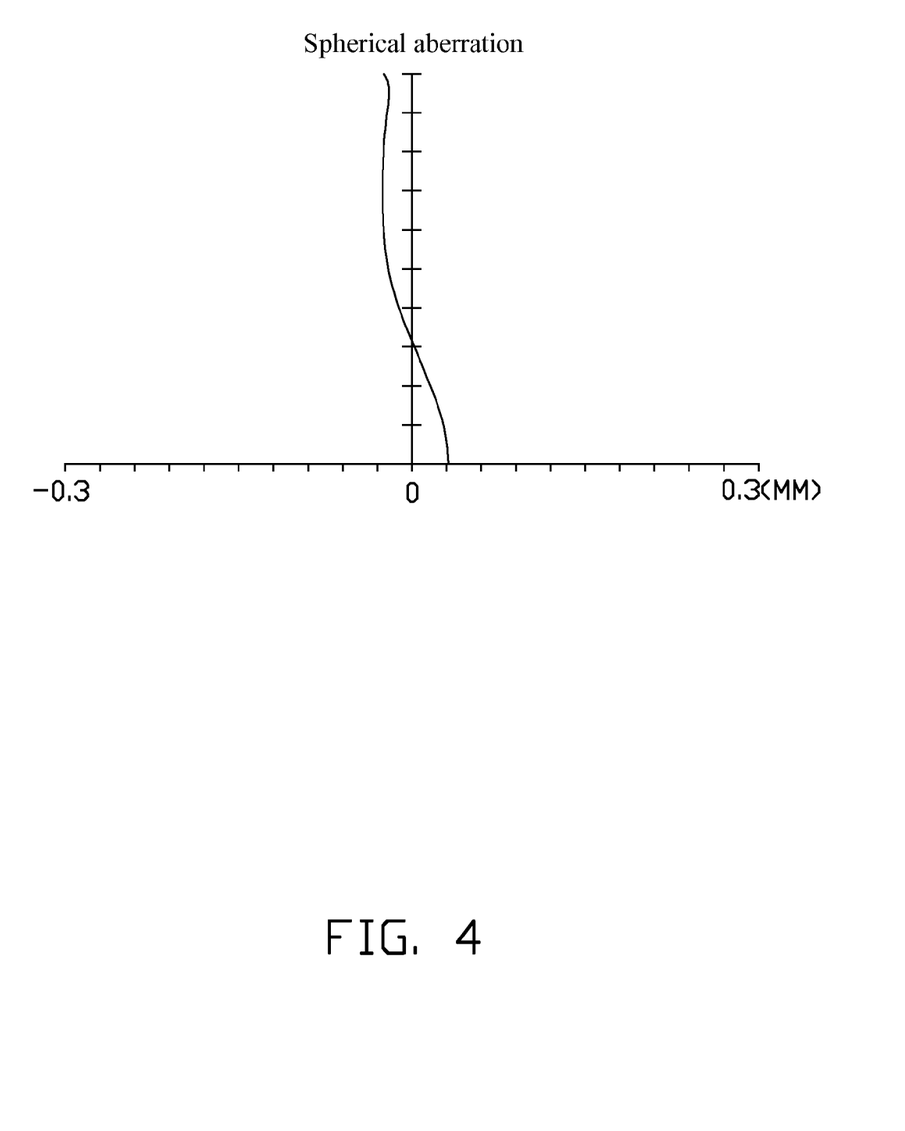

As illustrated in FIGS. 2-4, field curvature, distortion, and spherical aberration of the zoom lens system 100 in the wide angle state are shown. In FIG. 2, the curves T and S are the tangential field curvature curve and the sagittal field curvature curve respectively. The field curvature of the zoom lens system 100 in the wide angle state is from −0.05 mm to 0.05 mm. In FIG. 3, the distortion of the zoom lens system 100 in the wide angle state is from −5% to 5%. In FIG. 4, the curve is a spherical aberration characteristic curve of d light (wavelength: 588 nm) of the zoom lens system 100 in the wide angle state. The spherical aberration of the zoom lens system 100 in the wide angle state is from −0.03 mm to 0.03 mm.

Figure 5:
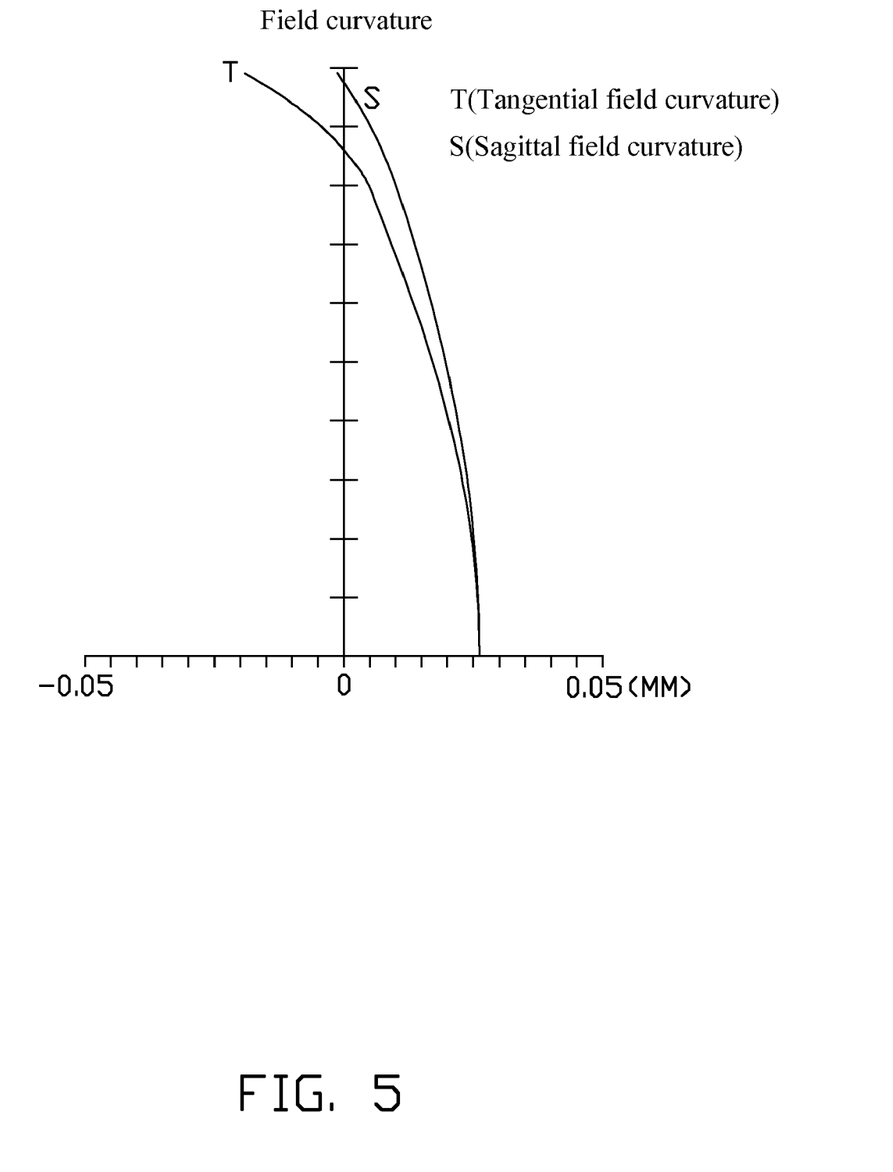
FIGS. 5~7 are graphs respectively showing field curvature, distortion and spherical aberration occurring in the zoom lens system, when the zoom lens system is in a middle state.
Figure 6:
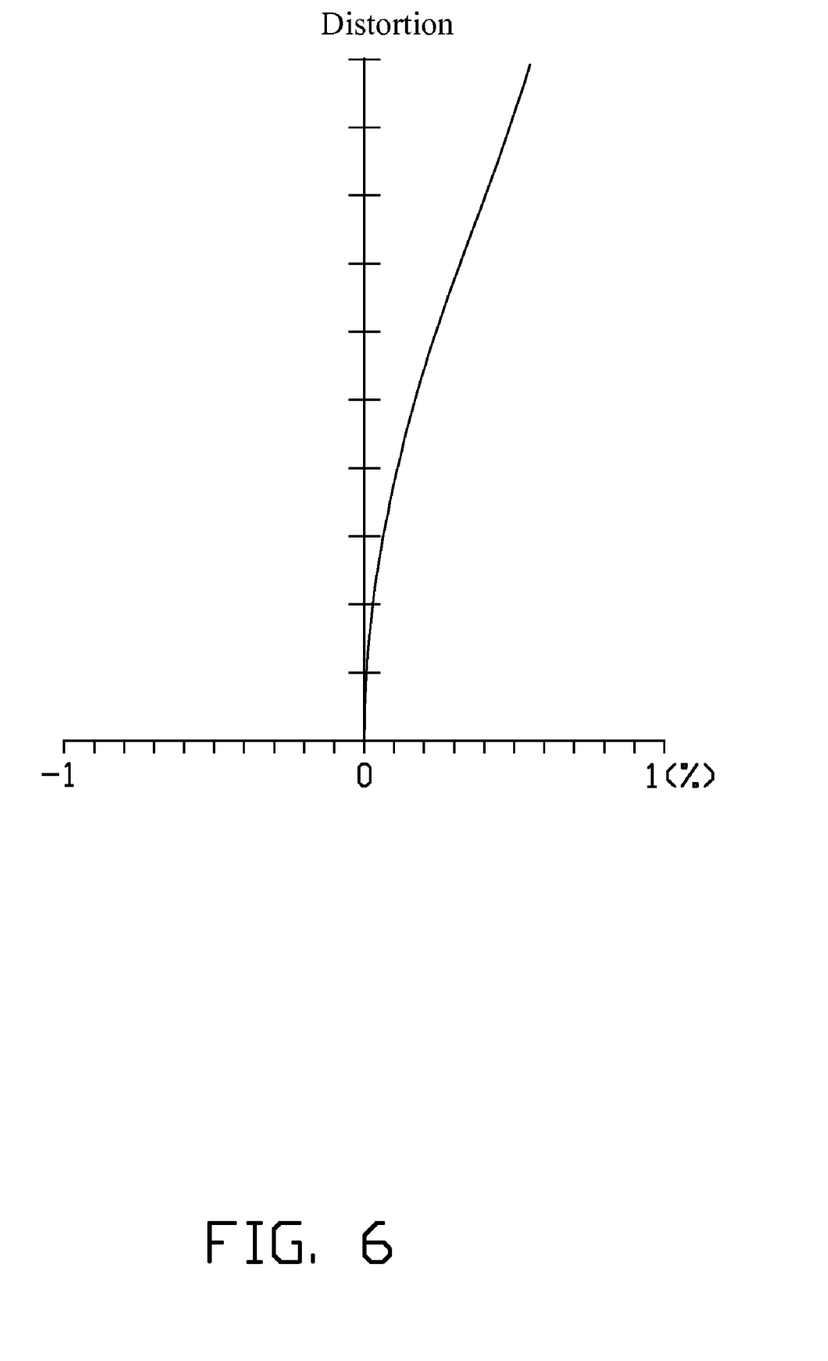
Figure 7:
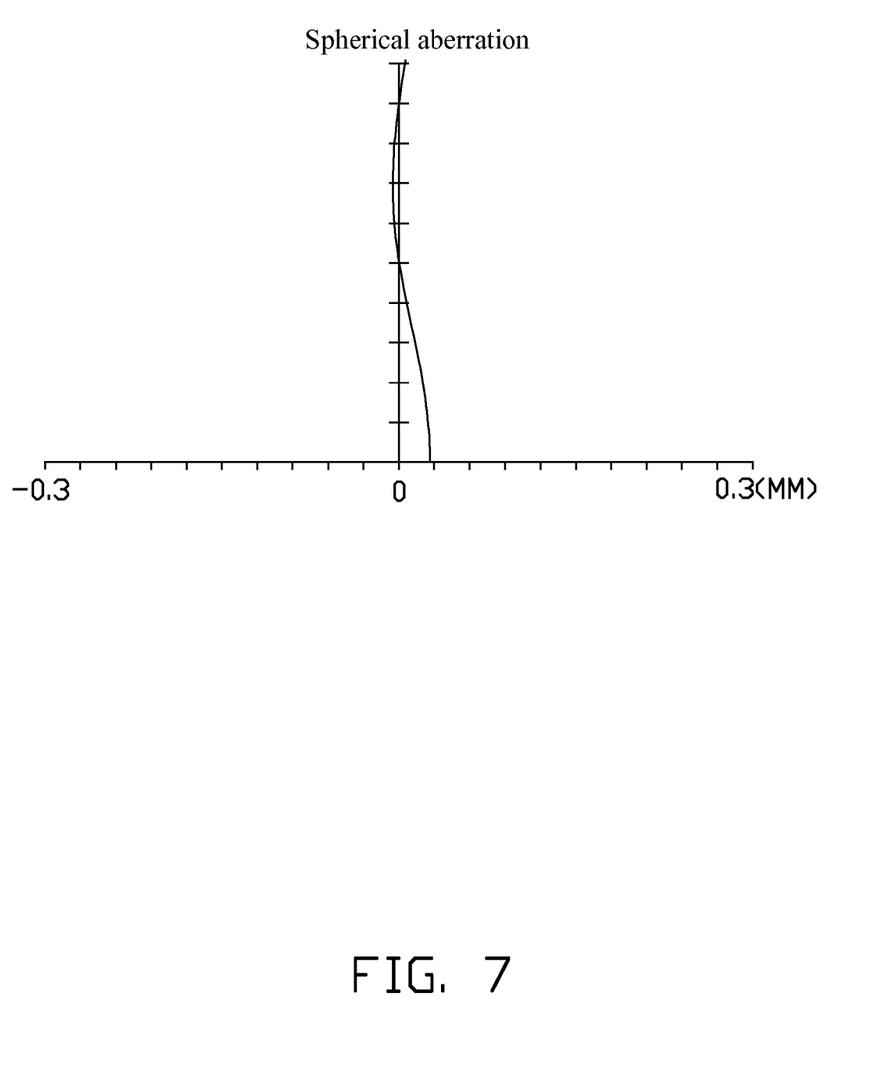

As illustrated in FIGS. 5-7, field curvature, distortion, and spherical aberration of the zoom lens system 100 in the middle state are shown. In FIG. 5, the curves T and S are the tangential field curvature curve and the sagittal field curvature curve respectively. The field curvature of the zoom lens system 100 in the middle state is from −0.05 mm to 0.05 mm. In FIG. 6, the distortion of the zoom lens system 100 in the middle state is from −1% to 1%. In FIG. 7, the curve is a spherical aberration characteristic curve of d light (wavelength: 588 nm) of the zoom lens system 100 in the middle state. The spherical aberration of the zoom lens system 100 in the middle state is from −0.03 mm to 0.03 mm.

Figure 8:
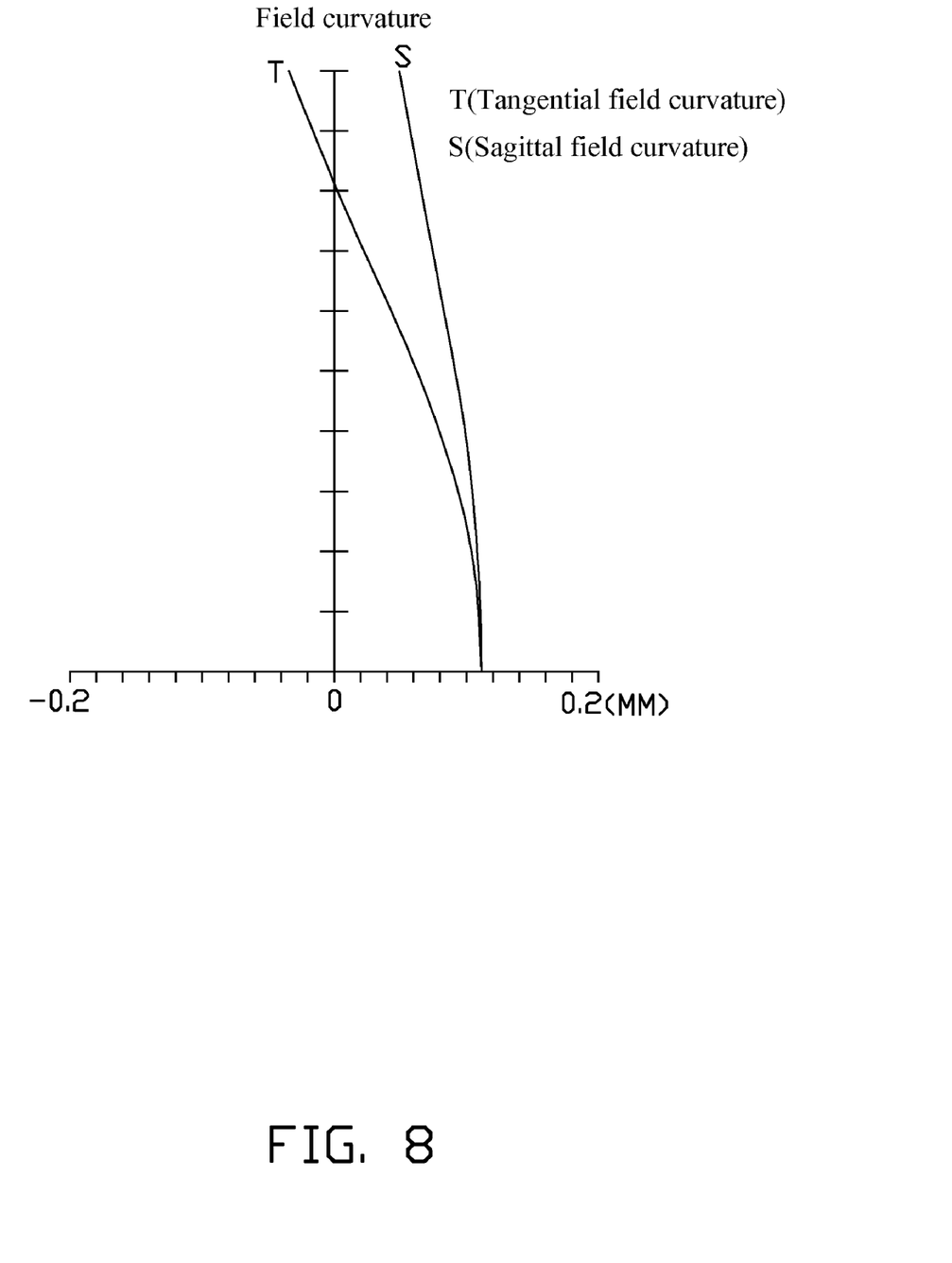
FIGS. 8~10 are graphs respectively showing field curvature, distortion and spherical aberration occurring in the zoom lens system, when the zoom lens system is in a telephoto state.
Figure 9:
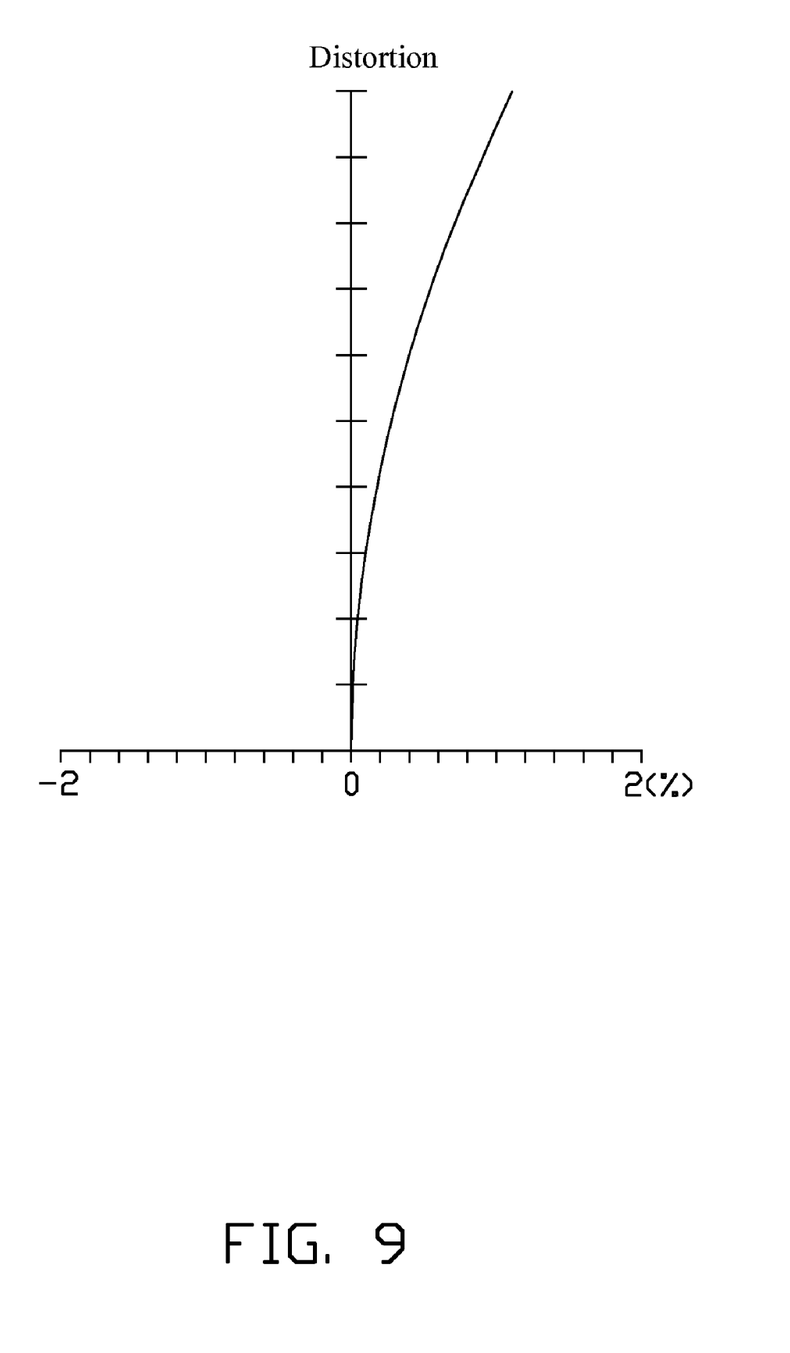
Figure 10:
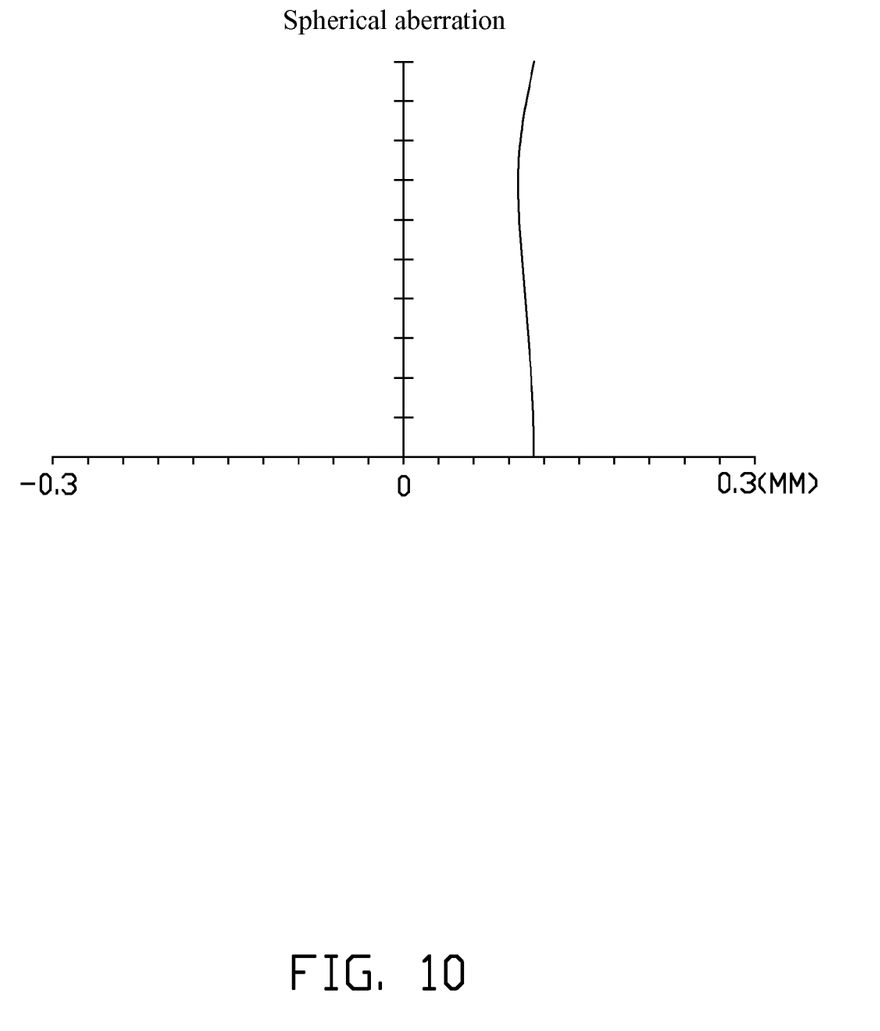

As illustrated in FIGS. 8-10, field curvature, distortion, and spherical aberration of the zoom lens system 100 in the telephoto state are shown. In FIG. 8, the curves T and S are the tangential field curvature curve and the sagittal field curvature curve respectively. The field curvature of the zoom lens system 100 in the telephoto state is from −0.2 mm to 0.2 mm. In FIG. 9, the distortion of the zoom lens system 100 in the telephoto state is from −2% to 2%. In FIG. 10, the curve is a spherical aberration characteristic curve of d light (wavelength: 588 nm) of the zoom lens system 100 in the telephoto state. The spherical aberration of the zoom lens system 100 in the telephoto state is from −0.12 mm to 0.12 mm.

In the embodiment, although the overall optical length of the zoom lens system 100 is reduced, the focal lengths of the second, third and fourth lens groups 20-40 are maintained within an acceptable range. The zoom lens system 100 can keep spherical aberration at a minimum and high resolution while reducing the overall length of the zoom lens system 100.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A zoom lens system, in the order from the object side to the image side thereof, comprising:
    a first lens group of positive refraction power;
    a second lens group of negative refraction power;
    a third lens group of positive refraction power;
    a fourth lens group of positive refraction power; and
    an imaging plane;
    wherein the first lens group and the third lens group are immovably positioned, the second lens group and the fourth lens group are movably positioned, the zoom lens system satisfies the formulae:

$5 < f3/f4 < 8.2$; and $2.1 < |f2/fw| < 3.2$,

Where f2-f4 respectively represent the effective focal lengths of the second, third and fourth lens groups, fw represents the shortest effective focal length of the zoom lens system.

2. The zoom lens system as claimed in claim 1, wherein the zoom lens system further satisfies the formula: $0.2 < M2/L < 0.4$, where M2 is the longest moving distance of the second lens group from a wide angle state to a telephoto state, L is the overall length of the zoom lens system.

3. The zoom lens system as claimed in claim 1, wherein the zoom lens system comprises a filter, the filter is positioned between the fourth lens group and the imaging plane.

4. The zoom lens system as claimed in claim 1, wherein the fourth lens group comprises, in the order from the object side to the image side of the zoom lens system, a ninth lens having positive refraction power, a tenth lens having negative refraction power and an eleventh lens having positive refraction power, the tenth lens and the eleventh lens are unified as a compound lens using adhesive, the ninth lens comprises at least one aspherical surface.

5. The zoom lens system as claimed in claim 4, wherein the ninth lens comprises two aspherical surfaces.

6. The zoom lens system as claimed in claim 1, wherein the second lens group comprises, in the order from the object side to the image side of the zoom lens system, a fifth lens, a sixth lens having negative refraction power, and a seventh lens having positive refraction power, the sixth lens and the seventh lenses are unified as a compound lens using adhesive.

7. The zoom lens system as claimed in claim 6, wherein the fifth lens is concave crescent-shaped, convex to the object side.

8. The zoom lens system as claimed in claim 6, wherein the zoom lens system further satisfies the formula: $45<(V6-V7)$, where V6, V7 respectively represent the Abbe number of the sixth and seventh lenses.

9. The zoom lens system as claimed in claim 1, wherein the first lens group comprises, in the order from the object side to the image side of the zoom lens system, a first lens, a second lens, a third lens and fourth lens, the second lens is a convex lens, the first lens and the second lenses are unified as a compound lens using adhesive.

10. The zoom lens system as claimed in claim 9, wherein the first lens is concave crescent-shaped, convex to the object side, the third lens is convex crescent-shaped, convex to the object side, the fourth lens is convex crescent-shaped, convex to the object side.

11. The zoom lens system as claimed in claim 9, wherein the fourth lens is a spherical lens.

12. The zoom lens system as claimed in claim 9, wherein the zoom lens system further satisfies the formula: $70<V2$, where V2 is the Abbe number of the second lens.

13. The zoom lens system as claimed in claim 1, wherein the third lens group comprises a eighth lens, the eighth lens is convex crescent-shaped, convex to the object side, the eighth lens comprises at least one aspherical surface.

14. The zoom lens system as claimed in claim 13, wherein the eighth lens comprises two aspherical surfaces.

15. The zoom lens system as claimed in claim 14, wherein the eighth lens is made of plastic.

16. The zoom lens system as claimed in claim 13, wherein the zoom lens system comprises an aperture stop positioned between the second lens group and the eighth lens.

17. The zoom lens system as claimed in claim 16, wherein the aperture stop is positioned on an object side surface of the eighth lens.

18. The zoom lens system as claimed in claim 17, wherein the aperture stop comprises an opaque material on an outer rim of the object side surface of the eighth lens.

* * * * *